United States Patent
Chandler (10) Patent No.: US 9,500,180 B1
(45) Date of Patent: Nov. 22, 2016

(54) RETRACTABLE ENERGY GENERATING WIND FAN WITH SELF-ADJUSTING BLADES

(76) Inventor: Gregg Chandler, Milton, MA (US)

(*) Notice: Subject to any disclaimer, the term of this patent is extended or adjusted under 35 U.S.C. 154(b) by 1151 days.

(21) Appl. No.: 13/561,051

(22) Filed: Jul. 29, 2012

(51) Int. Cl.
*F03D 3/06* (2006.01)
*F03D 7/02* (2006.01)

(52) U.S. Cl.
CPC .............. *F03D 3/061* (2013.01); *F03D 3/064* (2013.01); *F03D 3/067* (2013.01); *F03D 7/0268* (2013.01)

(58) Field of Classification Search
CPC ...... F03D 1/061; F03D 1/064; F03D 1/0658; F03D 1/067; F03D 3/061; F03D 3/062; F03D 3/064; F03D 3/067; F03D 7/0268
USPC ........ 416/132 B, 133, 159, 161, 178, 210 R, 416/211
See application file for complete search history.

(56) References Cited

U.S. PATENT DOCUMENTS

| | | | |
|---|---|---|---|
| 4,148,594 A | 4/1979 | Stafford | |
| 4,276,816 A | 7/1981 | Tuley | |
| 4,342,539 A | 8/1982 | Potter | |
| 4,383,797 A * | 5/1983 | Lee | F03B 17/062 405/22 |
| 4,472,110 A | 9/1984 | Sun Keu | |
| 6,726,439 B2 | 4/2004 | Mikkail et al. | |
| 6,902,370 B2 | 6/2005 | Dawson et al. | |
| 7,591,635 B2 * | 9/2009 | Ryu | F03D 3/068 416/111 |
| 8,137,052 B1 | 3/2012 | Schlegel | |
| 8,164,210 B2 | 4/2012 | Boone et al. | |
| 8,164,212 B2 | 4/2012 | Barber | |
| 2004/0025296 A1* | 2/2004 | Wade | E05D 3/02 16/273 |
| 2010/0090474 A1* | 4/2010 | Anguelo | F03D 3/02 290/55 |
| 2011/0033293 A1 | 2/2011 | Cavalieri | |
| 2012/0045345 A1* | 2/2012 | Horton, III | F03D 1/001 416/244 R |

FOREIGN PATENT DOCUMENTS

DE 202009002552 U1 * 6/2009 ............. F03D 3/068

* cited by examiner

*Primary Examiner* — Sean J Younger
(74) *Attorney, Agent, or Firm* — David J. Wilson (57) ABSTRACT

In one aspect, the invention is a novel and non-obvious design for wind fan or wind turbine that 1) can adjust to changes in wind direction and 2) is collapsible or retractable when desired. Further, the invention relates to a novel and non-obvious design for a fan blade assembly that allows for the ability of the wind turbine to adjust to changes in wind direction and allows for the wind turbine to collapse or retract into a housing when not in use.

16 Claims, 12 Drawing Sheets

RETRACTABLE ENERGY GENERATING WIND FAN WITH SELF-ADJUSTING BLADES

BACKGROUND OF INVENTION

Wind generated energy is rapidly becoming common in today's world. It has advantages over traditional energy sources. Unlike traditional power plants, it is clean requiring no burning of fuel. Unlike waterpower, wind powered energy sources can be set up almost anywhere, albeit some locations are more favored than others. Unlike solar power, wind power can be generated any time of the day and is not dependent upon clear skies. Unlike nuclear power, there are no radiation hazards. Many types of wind turbines and fan designs have been developed over the years. U.S. Pat. No. 8,164,210 to Boone, et al., (incorporated herein by reference) provides a comprehensive review of currently known technologies. However, there is still much room for advancement in the field. For example, devices suitable for use by and directed towards the needs of homeowners or small business owners have yet to be developed. Thus, there is a need in the art for wind turbines and the associated fan components that are suitable for the use on the scale needed by homeowners but are efficient and cost effective.

SUMMARY OF INVENTION

In one aspect, the invention relates to a wind fan or wind turbine that 1) can adjust to changes in wind direction and 2) is collapsible or retractable when desired. As used herein the terms "wind turbine" and "wind fan" are interchangeable.

Wind turbines are effective in generating electrical power. Wind energy is converted to electrical energy by causing the wind to turn an electrical generator. Such devices are stating to dot the urban and non-urban landscape. However, devices suitable for use by individuals, e.g., by homeowners or small businesses, are lacking. This is because the available wind turbines either are to large for the small-scale use needed by homeowners or local ordinances limit their use believing them to be unsightly or dangerous.

Local ordinances limit the use of wind turbines by home owners for numerous reasons, not the least of which are i) they may be considered unsightly, ii) they are large and may interfere with power lines especially in the event of storms, and iii) they are difficult to service by a typical home owner.

Making a typical turbine smaller may not solve these problems. It would still need to extend above the roofline of the houses thereby still being considered unsightly by some communities or individuals and potentially dangerous in the event of a storm. Further, making present wind turbine designs smaller may not efficiently met the power requirements of a typical homeowner.

The present invention solves these problems by providing a compact yet efficient turbine (fan) design that can be retracted in the event of a storm or during the day when it is most likely to be seen. In this regard, the turbine of the present invention is 1) collapsible and retractable so that it can be easily stored out of sight and 2) is not to overly broad, such as is the case with blade (propeller) style turbines.

The fan or turbine of the present invention can be refracted by any means known in the art. The shaft on which the fan is engaged (i.e., the fan shaft) may be, for example, telescopic or may recede into to suitable well under the fan shaft or a combination of both. The mechanism by which the fan shaft is raised and lowered may be powered by, for example, hydraulics (similar to those used in elevators or automotive lifts), a gear and track mechanism (i.e., a rack and pinion), a cable and pulley system or any combination, or any other means known to those of skill in the art.

The fan system of the present invention is unique in that it is comprised of a fan component that can, in one embodiment, serve as the entire fan blade system of the present invention or, in another embodiment, serve as a support for fan blades or "sails" wherein the sails are attached to (e.g., supported by) at least two of the fan blade components (fan blade assemblies) of the present invention. That is, the fan sails are attached at the top to one fan blade assembly and at the bottom to another fan blade assembly. In this way, the sails are supported top and bottom. In other embodiments, the sails may also have one or more additional fan blade assemblies wherein the additional fan blade assemblies are positioned in between the upper (top) and bottom (lower) fan blade assemblies.

The fan components (fan blade assemblies) of the present invention comprise a central cylinder, suitable for receiving a shaft; a plurality of single arms (or single-bladed fins or blades) projecting from the central cylinder, said single arms (or single-bladed fins or blades) substantially equidistant from each other, said single arms (or single-bladed fins or blades) further having a first end and a second end, said first ends attached to said central cylinder, each second end attached to a substantially semi-cylindrical element, said semi-cylindrical element comprising a curved surface with an inner face and an outer face, said second end of said single arms (or single-bladed fins or blades) attached to the outer face of said curved surface of said semi-cylindrical element. Additionally, the fan blade assembly may comprise a plurality of paired arms (or double-bladed fins or blades) having a first paired arm and a second paired arm, each paired arm (or blade of the double-bladed fins or blades) having a first and a second end wherein the first end of each paired arm (or blade) is connected to a second cylinder to form an angle of approximately 15° to approximately 75° (or approximately 25° to approximately 65° or approximately 35° to approximately 55° or approximately 45°) from each other and wherein said second cylinder sized to fit into said semi-cylindrical element described above.

In the embodiment wherein the fan assembly component of the present invention comprises blades, the blades may be of any suitable width necessary to permit the capture of wind power necessary for the turning of an electrical generator. Further, the blades may be angled to provide maximal force to the shaft. The design of such blades is known to one of skill in the art. Further, of course, the blade design will depend on the size of the generator and one of ordinary skill in the art will be able to determine the suitable number of blades, blade size and angle for any chosen generator.

Further still, the fan components including the fan blade assemblies, are made of lightweight material(s) such as plastics, aluminum, etc. The manufacture of components as would be needed for the present invention is known to one of ordinary skill in the arts of, for example, metal work, woodworking and plastics.

In the embodiment, wherein the fan blade assembly of the present invention comprises arms, the arms are suitable for the attachment of sails. The sails will be attached to at least one additional fan component so that the sails will be secured at the top and bottom. In this manner, the sails will catch the wind and cause the fan to turn.

In the present invention, the terms "arms," "blades" and "fins" are interchangeable with the distinction being that arms are not as wide as blades and that blades and fins are similar if not identical.

One unique feature of the fan blade assembly component of the present invention is the incorporation of paired arms (or double bladed fins) to the central portion of the fan assembly component. The double bladed fins (or paired arms) double the amount of wind that can be caught by a similarly size fan. Further, the ability of the double bladed fins (or paired arms) to partially rotate (or pivot) in relation to the central portion of the fan assembly component permits each fin of the double bladed fin or arm of the paired arms to independently self adjust to the wind direction, thereby increasing the wind power caught by the fan. In this regard, the pivot points of the bladed fins or paired arms that interact with the central portion of the fan component, is made from or comprises one or more low-friction ("self lubricating") materials such as plastic, nylon, TEFLON®, brass, bronze, sintered bronze, etc., as is known by those of skill in the art. The pivot points may also comprise bushings, buffers, spacers, bearings (ball or roller) and the like. If bearings are used, sealed, permanently lubricated bearings are preferred. As used herein, "self lubrication" is defined by the materials ability to transfer microscopic amounts of material to the mating surface. This transfer process creates a film that provides lubrication and reduces friction over the contact surface. Self-lubricating is also defined as "low friction," i.e., slippery or slick. Nylon, for example, is a low friction material.

The drive mechanism that transfers the power of the wind driven shaft to the generator may be of any mechanism known to those of skill in the art and include, without limitation and in any workable combination, belts, gears, chains, direct drive shaft(s), any of the forgoing with or without gearing to increase of decrease rotations as may be needed for the efficient generation of power, as is well within the skill on one of ordinary skill in the arts.

The present invention relates to a fan blade assembly suitable for use in a fan or wind turbine, comprising: central cylinder, suitable for receiving a shaft; plurality of single arms or single-bladed fins projecting from the central cylinder, said single arms or single-bladed fins substantially equidistant from each other, said single arms or single-bladed fins further having a first end and a second end, said first ends attached to said central cylinder, each second end attached to a substantially semi-cylindrical element, said semi-cylindrical element comprising a curved surface with an inner face and an outer face, said second end of said single arms or single-bladed fins attached to the outer face of said curved surface of said semi-cylindrical element; and, optionally, a plurality of paired arms or double-bladed fins having a first paired arm and a second paired arm, each paired arm or blade of the double-bladed fins having a first and a second end wherein the first end of each paired arm or blade is connected to a second cylinder to form an angle of approximately 15° to approximately 135° from each other (or, the angle is approximately 25° to approximately 100° or approximately 30° to approximately 60° or about 45°) and wherein said second cylinder sized to fit into said semi-cylindrical element. The fan blade assembly may also comprise single arms or single-bladed fins are connected to adjacent arms or fins. The fan blade assembly may further comprise said semi-cylinders that are connected to adjacent semi-cylinders.

In a further embodiment, the fan blade assembly may comprise a spacer that is positioned between the second cylinder of said paired arm or double-bladed fin and the semi-cylinder, the spacer is preferably made of a low friction material or materials such as, for example, plastic, nylon, TEFLON®, brass, bronze and copper. Further still, the fan blade assembly may allow the second cylinder to at least partially rotate by about 1° to about 130° or about 15° to about 90° when fit into the semi-cylindrical element.

Further still, the fan blade assembly may be operationally connected to an electrical generator. The fan blade assembly may be retractable into a housing when not in use and extended when in use. The means for retracting and extending the fan blade assembly is selected from, for example, telescoping poles, cables, rack and pinion mechanism and hydraulics or hydraulic lifts. The manufacture and use of any of these is known to one of ordinary skill in the art.

Further still, the electrical power-generating device of the present invention may comprise a first and a second fan blade assembly with first fan blade assembly and the second fan blade assembly positioned along a shaft, the first fan blade assembly at a distance from the second fan blade assembly along the shaft and the first fan blade assembly operationally connected to the second fan blade assembly with one or more sails, each sail extending from one of the arms or fins of one of the paired arms of the first fan blade assembly to one of the arms or fins of one of the paired arms of the second fan blade assembly. The sails may be collapsible by being made out of fabric such as silk, nylon, rip-stop nylon, or any light weight fabric known to those of ordinary skill in the art. Because the sails are collapsible, the sails can collapse when the first fan blade assembly and the second fan blade assembly are brought into close proximity to each other by sliding one or both of the fan blade assembly components along said shaft. The fan blade assembly(ies) can be reversibly retracted into a housing when not in use by lowering the shaft, if made from telescoping pieces, nesting the telescoping pieces into each other.

Other features and advantages of the invention will be apparent from the following description.

DETAILED DESCRIPTION OF PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

Figure 1:
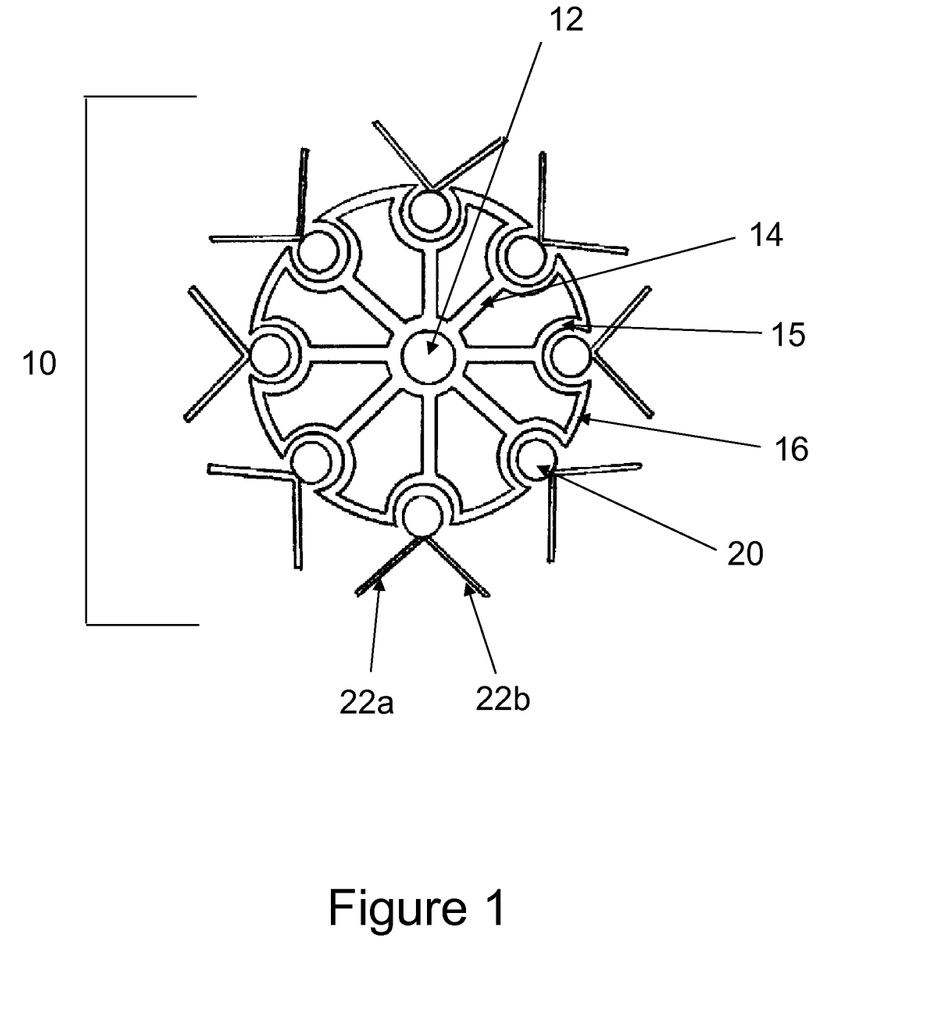
FIG. 1 shows a top view of the fan blade assembly of the present invention.

FIG. 1 shows a top view of the fan blade assembly 10 of the present invention. The central cylinder 12 is attached to a plurality of single-bladed fins or arms 14. Attached thereto are semi-circular elements 15. Within the area contained in the semi-circular element is a second cylinder (hollow or solid) 20 to which are attached a pair of blades or arms 22a and 22b. Located between the semi-circular elements 15 are connector elements 16. In another embodiment, the connector elements can be located between the single-bladed fins arm arms 14.

Figure 2:
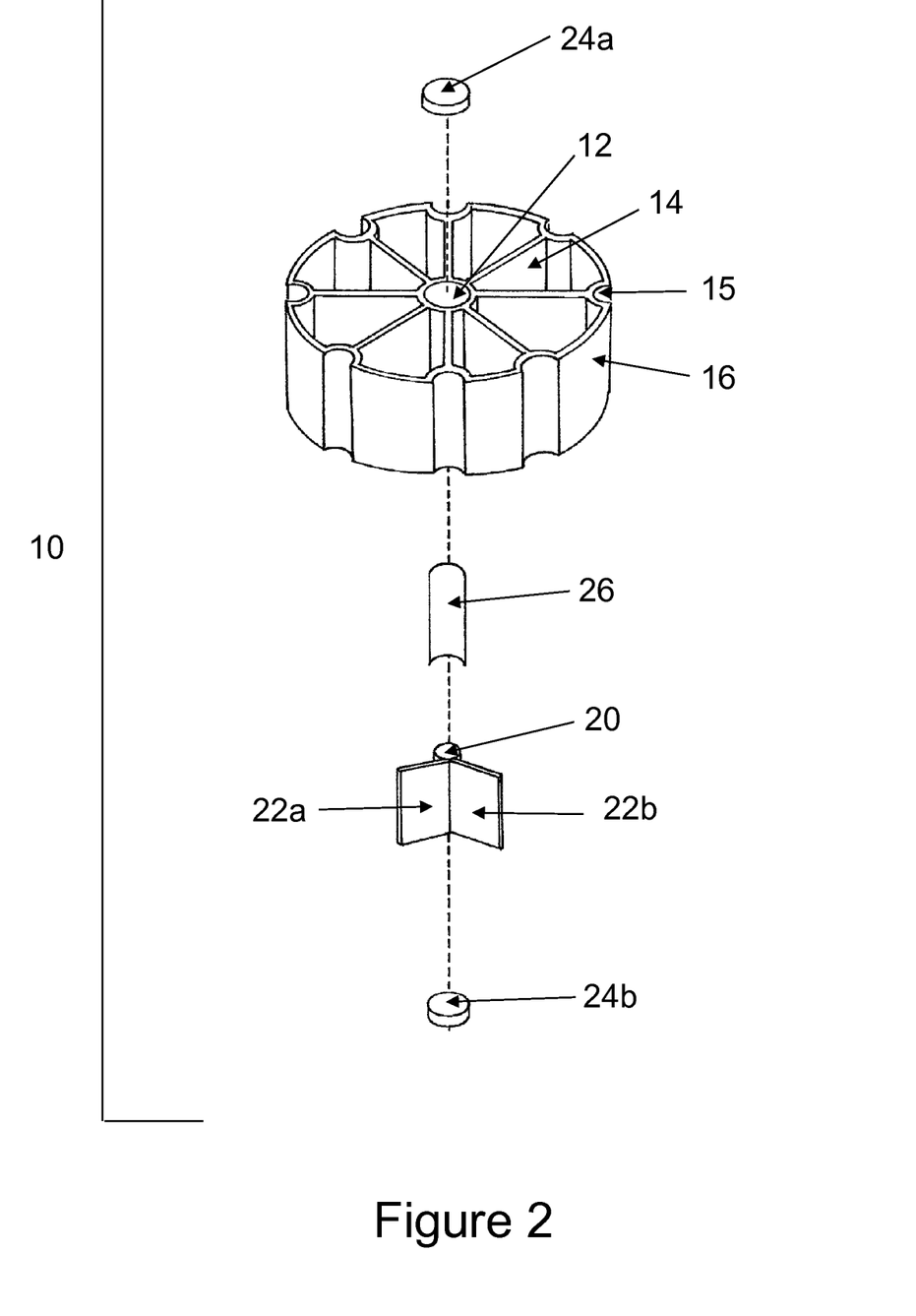
FIG. 2 shows a perspective view of the fan assembly of the present invention. One double-bladed fin is removed for visualization of the parts of the fan blade assembly.

FIG. 2 shows an exploded view of the fan blade assembly 10 of the present invention. The figure is labeled as in FIG. 1 except also shown are end caps 24a and 24b as well as shim or bushing 26.

Figure 3:
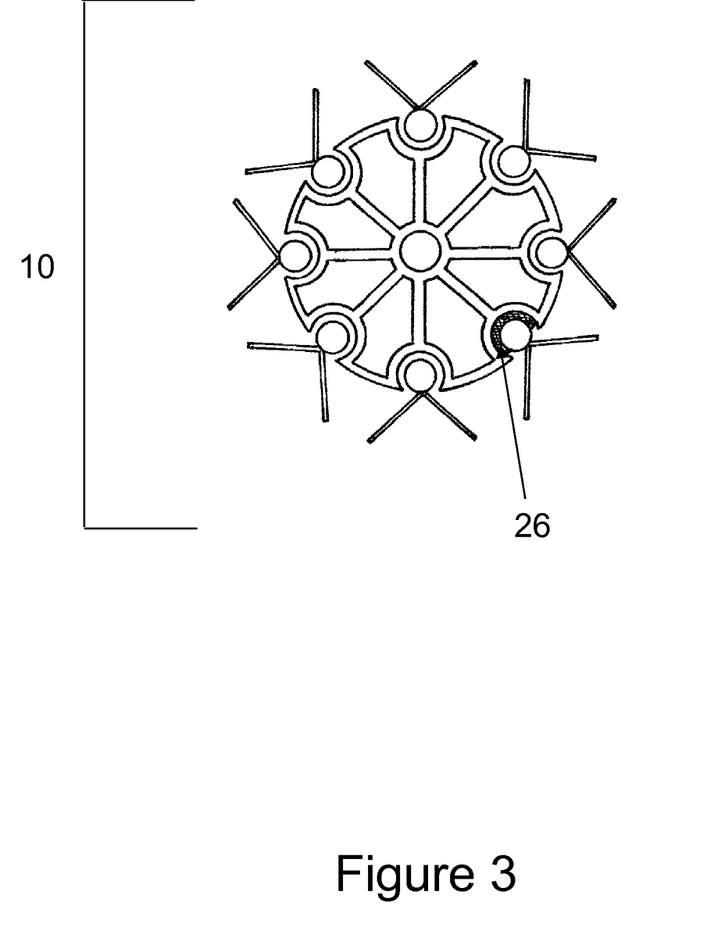
FIG. 3 shows a top view of the fan blade assembly of the present invention with an optional spacer/bushing positioned between the semi-circular element and the cylinder connected to the double-bladed fin.

FIG. 3 shows a top view of the fan blade assembly 10 of the present invention similar to FIG. 1 except that the shim or bushing 26 is shown between one of the semi-circular elements and the second cylinder.

Figure 4:
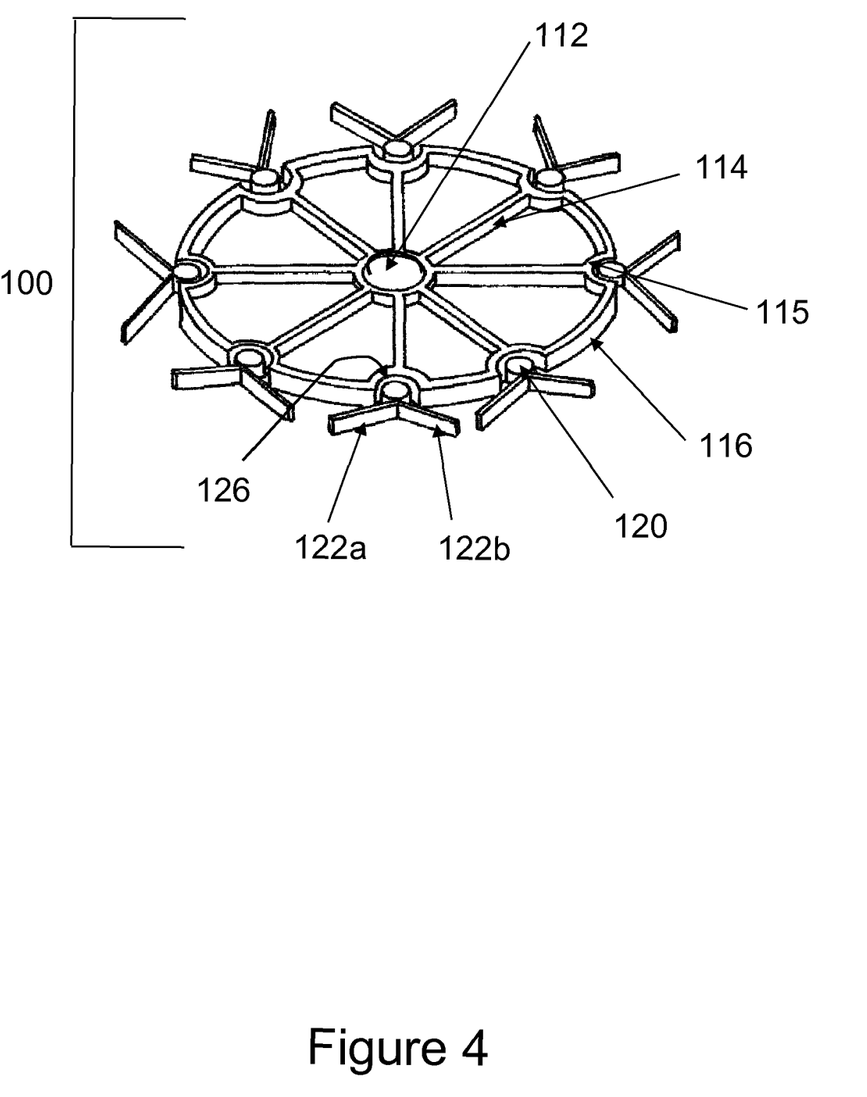
FIG. 4 shows a perspective view of the embodiment of the present invention comprising paired arms in lieu of a double-bladed fin.

FIG. 4 shows a perspective view of the fan blade assembly 100 of the present invention wherein arms are shown instead of fins. The central cylinder 112 is attached to a plurality of single-bladed fins or arms 114. Attached thereto are semi-circular elements 115. Within the area contained in the semi-circular element is a second cylinder (hollow or solid) 120 to which are attached a pair of blades or arms 122a and 122b. Located between the semi-circular elements 115 are connector elements 116. In another embodiment, the connector elements can be located between the single-bladed fins arm arms 114. The location of a shim or bushing is also shown at 126.

Figure 5:
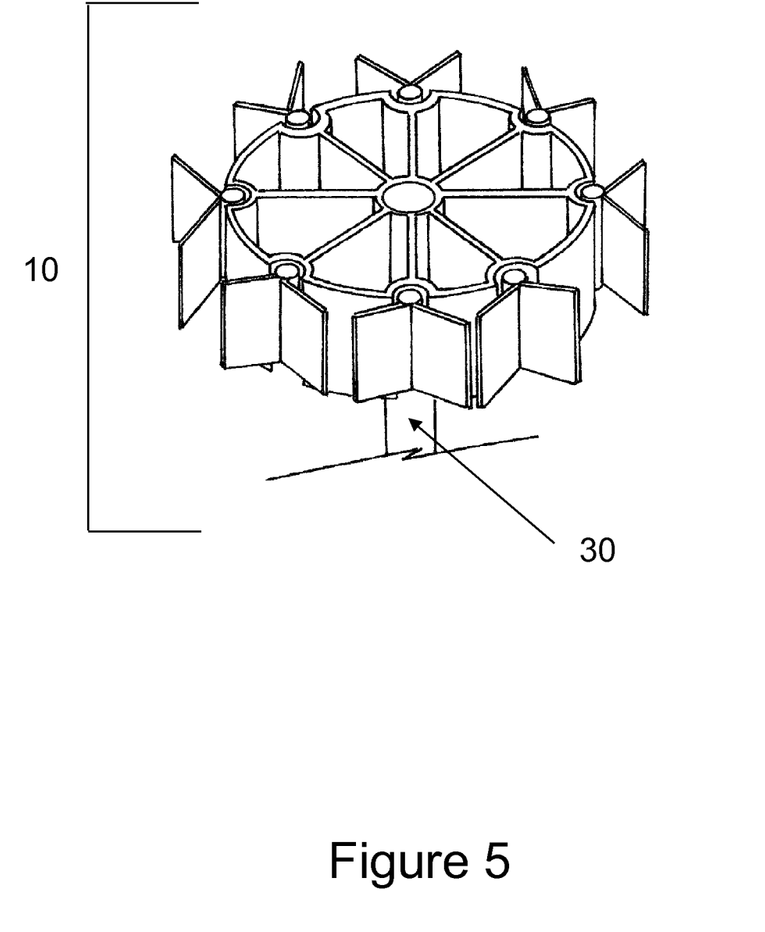
FIG. 5 shows the fan blade assembly of the present invention installed on a shaft such as a drive shaft.

FIG. 5 shows a perspective view of the fan blade assembly 10 of the present invention with a portion of shaft 30 shown.

Figure 6:
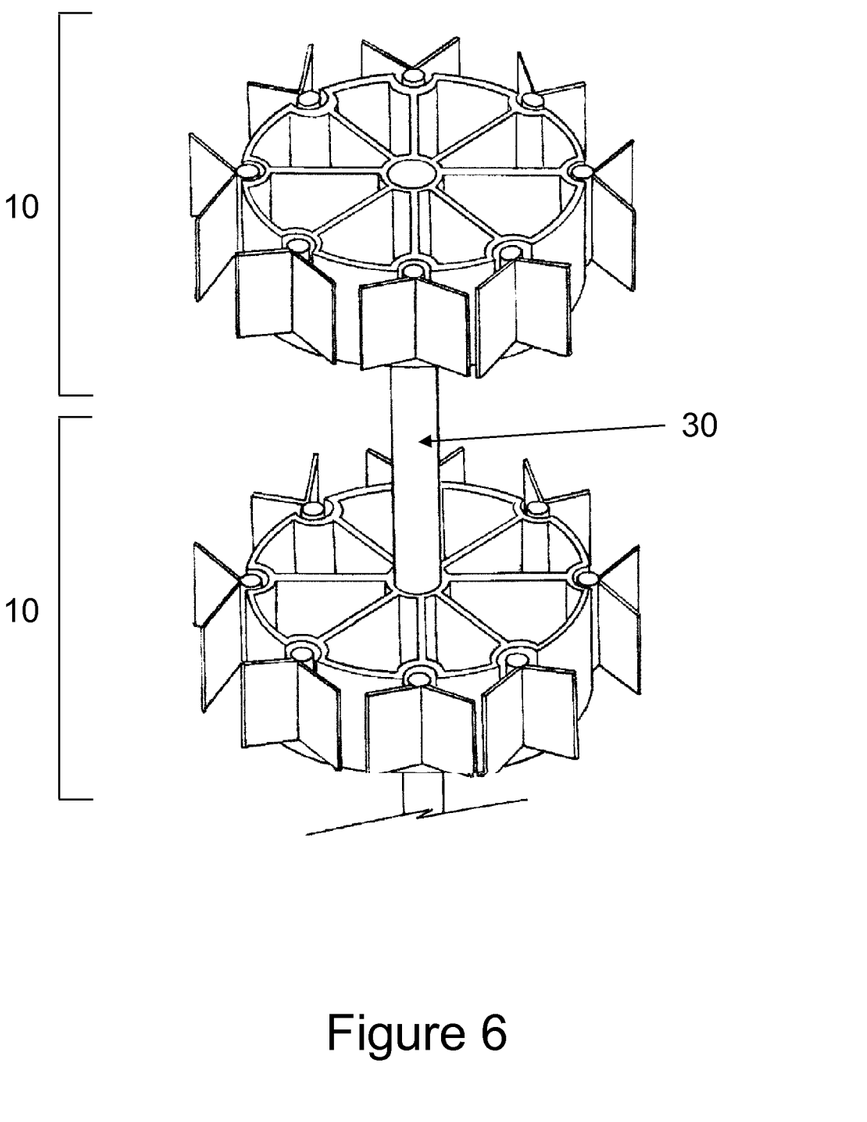
FIG. 6 shows two fan components mounted on apposite ends of a shaft such as a drive shaft. In a preferred embodiment the two fan components are aligned with each other.

FIG. 6 shows two fan blade assemblies 10 of the present invention connected by shaft 30.

Figure 7:
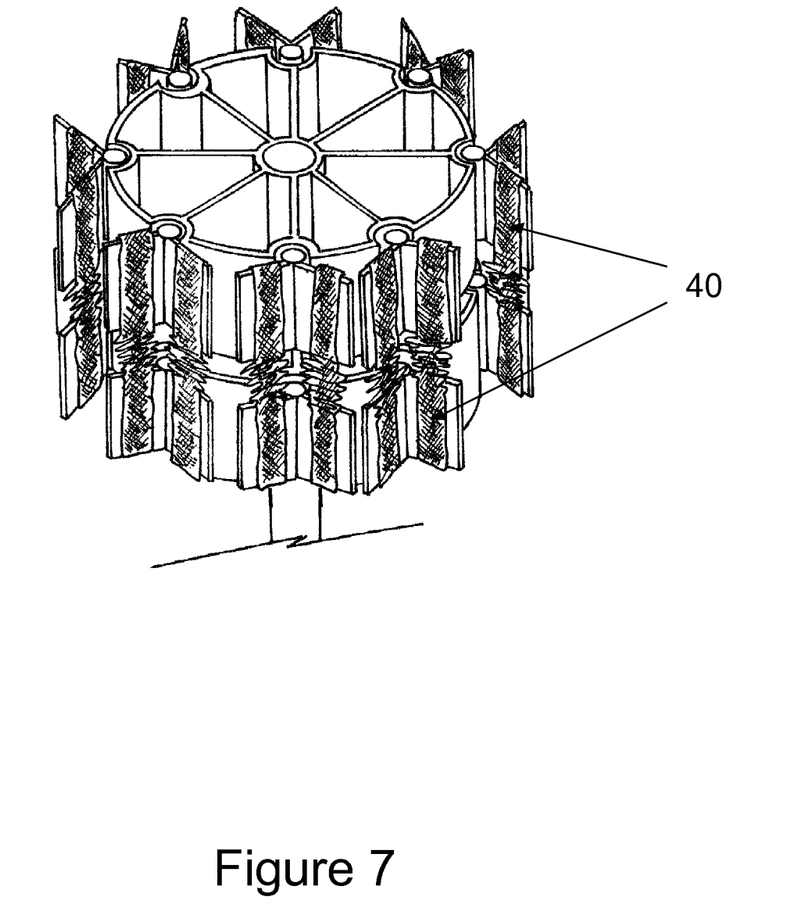
FIG. 7 shows two fan blade assemblies on a shaft with sails attached to the fins of the two aligned top and bottom fins and wherein the lower fan blade assembly is in close proximity to the upper fan blade assembly such that the sails are compressed or folded.

FIG. 7 shows an assembly comprising two fan blade assemblies 10 positioned close to each other on the shaft and sails 40 connected to the fins of the respective fan blade assemblies and folded in between the two fan blade assemblies.

Figure 8:
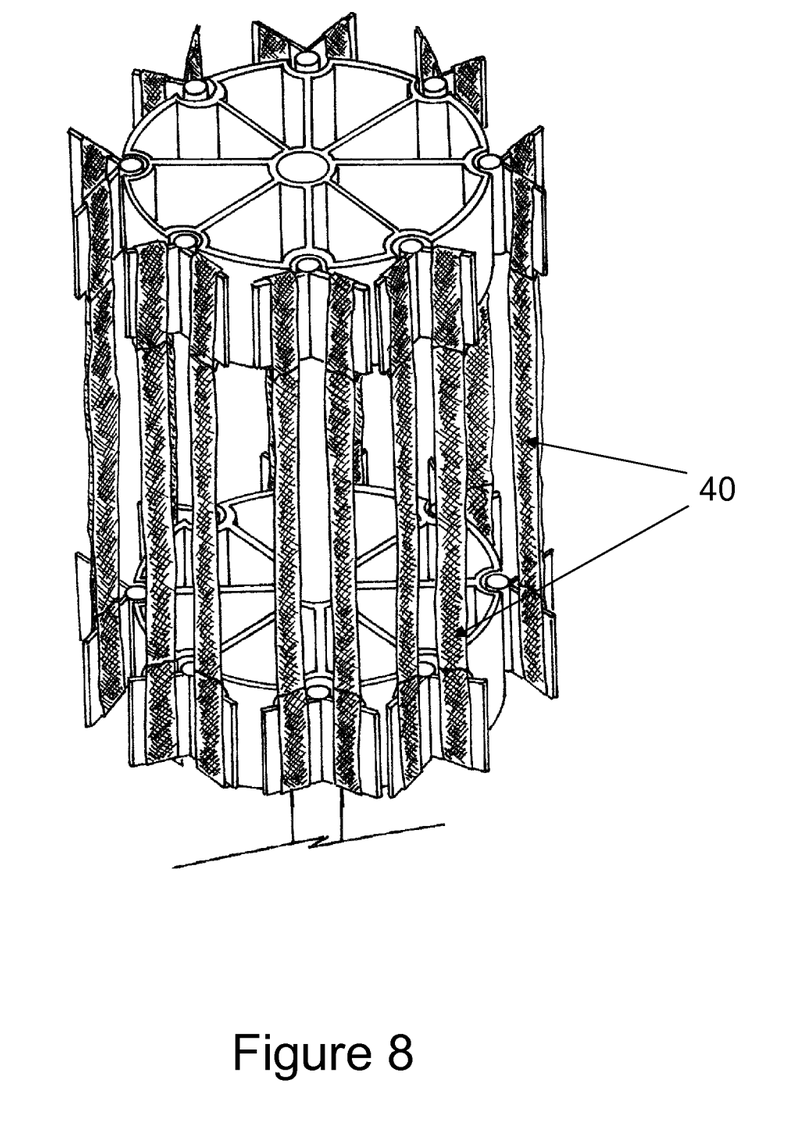
FIG. 8 shows two fan blade assemblies on a shaft with sails attached to the fins of the two aligned top and bottom fins and wherein the lower fan blade assembly is not in close proximity to the upper fan component such that the sails are rendered taught.

FIG. 8 shows an assembly comprising two fan blade assemblies 10 positioned apart from each other on the shaft and sails 40 connected to the fins of the respective fan blade assemblies and drawn taut between the two fan blade assemblies.

Figure 9:
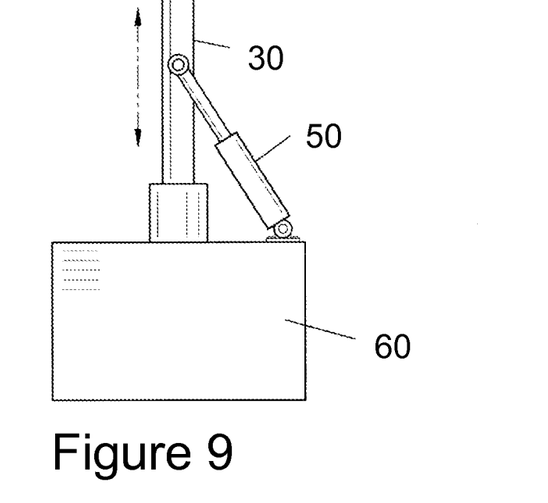
FIG. 9 shows one embodiment of a hydraulic lift mechanism of the present invention.

FIG. 9 shows one embodiment of a hydraulic lift mechanism of the present invention. The hydraulic lift mechanism may also function with telescoping sections that nest into one another when retracted. The shaft 30 is raised and lowered by the hydraulic mechanism 50 and ends in the power generator 60.

Figure 10:
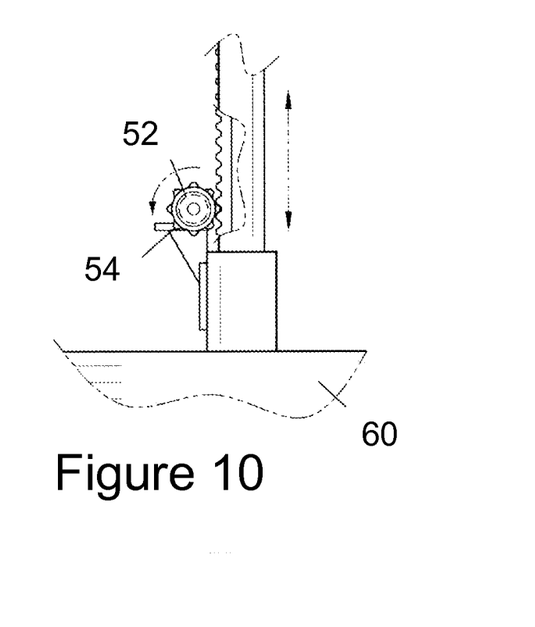
FIG. 10 shows one embodiment of a rack and pinion (or gear-type) lift mechanism of the present invention.

FIG. 10 shows one embodiment of a rack and pinion (or gear-type) lift mechanism 52 of the present invention. As with the hydraulic mechanism, the rack and pinion mechanism raises and lowers the fan assemblies when desired by the user or when triggered automatically. The generator is identified 60.

Figure 11:
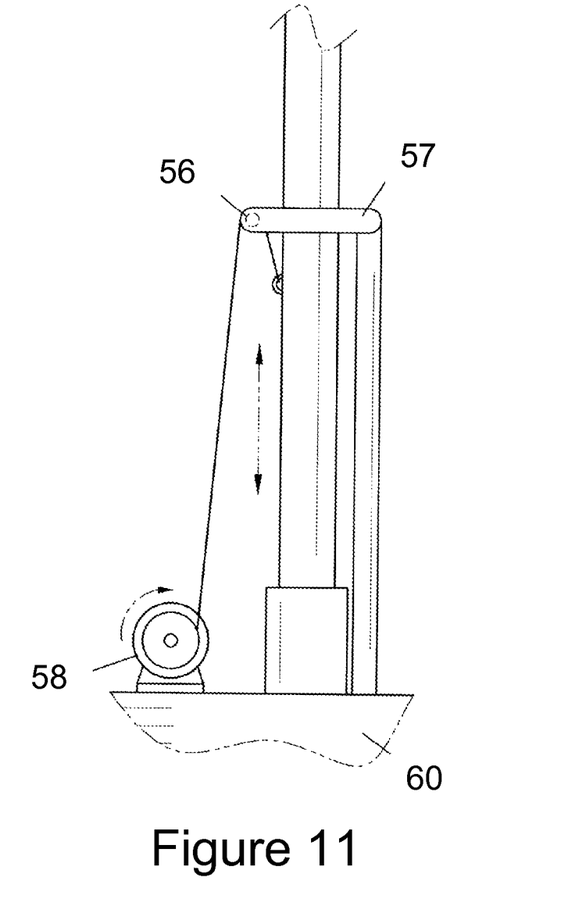
FIG. 11 shows one embodiment of a cable and pulley lift mechanism of the present invention.

FIG. 11 shows one embodiment of a cable and pulley lift mechanism (comprising parts 56, 57 and 58) of the present invention. Element 58 is the drive mechanism and cable take-up spool, element 57 is the ring support and element 56 is a pulley.

Figure 12:
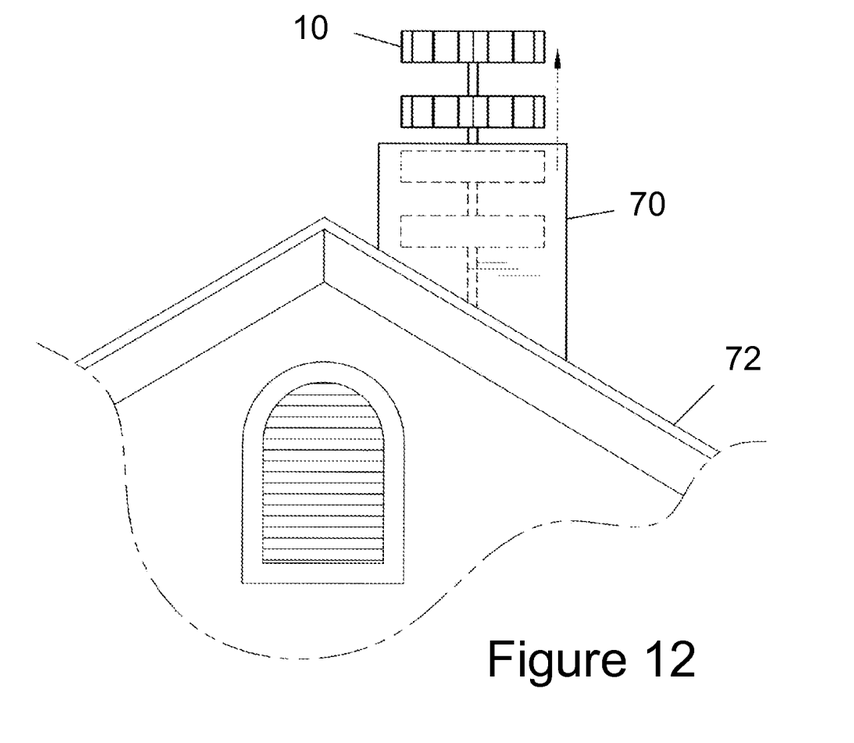
FIG. 12 shows the present invention installed on a building with indications of how the fan assembly of the present invention can be raised and lowered.

FIG. 12 shows the present invention installed (including the fan assembly(ies) 10 of the present invention) on a building 72 with indications of how the fan assembly of the present invention can be raised and lowered. The device can be refracted into a housing 70 when desired.

Figure 13:
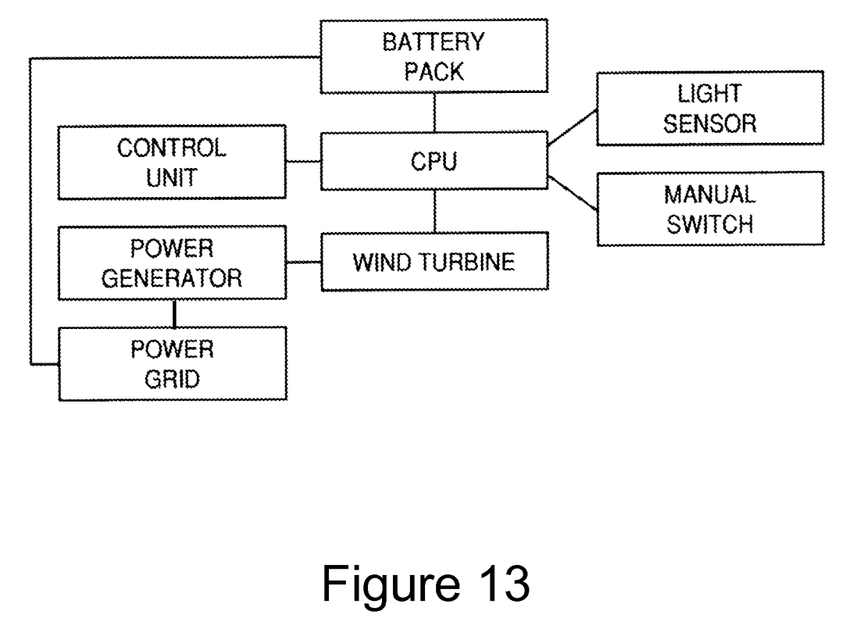
FIG. 13 shows an exemplary schematic diagram of the control mechanism of the present invention.

FIG. 13 shows an exemplary schematic diagram (or block diagram) of the control mechanism of the present invention. The representation is exemplary only. One of ordinary skill in the art will be able to develop other control scenarios based on the teachings of the present invention.

What is claimed is:

1. A fan blade assembly suitable for use in a fan or wind turbine, comprising:
   a. a central cylinder, suitable for receiving a shaft and defining a central axis of rotation of the fan blade assembly;
   b. a plurality of single arms or single-bladed fins projecting from the central cylinder, said single arms or single-bladed fins substantially equidistant from each other, said single arms or single-bladed fins further having a first end and a second end, said first ends attached to said central cylinder, each second end attached to a substantially semi-cylindrical element, said semi-cylindrical element comprising a curved surface with an inner face and an outer face, said second end of said single arms or single-bladed fins attached to the outer face of said curved surface of said semi-cylindrical element;
   c. a plurality of paired arms or double-bladed fins having a first paired arm and a second paired arm, each paired arm or blade of the double-bladed fins having a first and a second end wherein the first end of each paired arm or blade is connected to a second cylinder to form an angle of approximately 15° to approximately 135° from each other and wherein said second cylinders are sized to fit into said semi-cylindrical elements and wherein each paired arm or blade of the double-bladed fins extends substantially radially outwardly relative to the central axis from where they are connected to the second cylinders are attached at the periphery of the fan blade assembly.

2. The fan blade assembly of claim 1, wherein said single arms or single-bladed fins are connected to adjacent arms or fins.

3. The fan blade assembly of claim 1, wherein said semi-cylinders are connected to adjacent semi-cylinders.

4. The fan blade assembly of claim 1, wherein a spacer is positioned between said second cylinder of said paired arm or double-bladed fin and said semi-cylinder.

5. The fan blade assembly of claim 1, wherein said second cylinder is capable of rotational movement when fit into said semi-cylindrical element.

6. The fan blade assembly of claim 5, wherein said rotational movement is between approximately 30 degrees and approximately 90 degrees.

7. The fan blade assembly of claim 4, wherein said spacer is comprised of a low-friction material.

8. The fan blade assembly of claim 7, wherein said low-friction material is selected from the group consisting of plastic, nylon, brass, bronze and copper.

9. An electrical power-generating device comprising a fan assembly, said fan assembly comprising the fan blade assembly of claim 1 operationally connected to a generator.

10. The electrical power-generating device of claim 9, wherein said fan assembly is reversibly retractable into a housing when not in use.

11. The electrical power-generating device of claim 10, wherein the means for retracting said fan assembly is selected from the group consisting of telescoping poles, cables, rack and pinion mechanism and hydraulics.

12. The electrical power-generating device of claim 9, wherein said device comprises a first and a second fan blade assembly, said first fan blade assembly and said second fan blade assembly positioned along a shaft, said first fan blade assembly at a distance from said second fan blade assembly along said shaft and said first fan blade assembly connected to said second fan blade assembly with one or more sails, each sail extending from one of the arms or fins of one of the paired arms of the first fan blade assembly to one of the arms or fins of one of the paired arms of the second fan blade assembly.

13. The electrical power generating device of claim 12, wherein said sails are collapsible.

14. The electrical power generating device of claim 13, wherein said sails collapse when the first fan blade assembly and the second fan blade assembly are brought into close proximity to each other by sliding one or both of the first fan blade assembly component and said second fan blade assembly component along said shaft.

15. The electrical power generating device of claim 14, wherein said fan assembly is reversibly retractable into a housing.

16. The fan component of claim 1, wherein said angle is approximately 25° to approximately 100° or approximately 30° to approximately 60°.

\* \* \* \* \*